3,113,069
BIS (TRIPHENYL TIN) POLYSULPHIDES AND METHOD OF COMBATING FUNGI

Antje Kaars Sijpesteijn, Utrecht, and Gerrit Lucas Wiggerink, Emmasingel, Eindhoven, Netherlands, assignors to North American Philips Company, Inc., New York, N.Y., a corporation of Delaware
No Drawing. Filed May 11, 1961, Ser. No. 109,275
Claims priority, application Netherlands May 27, 1960
5 Claims. (Cl. 167—30)

It is known that organic compounds of tetravalent tin have fungitoxic activity. Such compounds are, for example, triphenyl tin compounds, such as triphenyl tin acetate, and bis(trialkyl tin) compounds, for example bis(triethyl tin) sulphide.

It is also known that many compounds having satisfactory fungitoxic activity are not suitable for combating moulds on living plants in practice, because these compounds have a strong phytotoxic action and might do excessive damage to the plants.

Hence, for combating moulds only a few of the above-mentioned organic tin compounds would appear to be suitable. However, if no special precautions are taken, their use also causes damage in general or to certain of the plants treated.

The invention relates to organic compounds of tetravalent tin which have a satisfactory fungitoxic activity and no or so small a phytotoxic activity that they may be particularly suitable for combating moulds on living plants in practice. They are also very suitable for use in seed disinfectants.

The invention relates to a composition for combating moulds on living plants and to its production and use, which composition contains a triphenyl tin compound as the active ingredient, if required in combination with adjuvants, such as surface-active substances, dispersing agents and/or adhesives, and it is characterized in that a compound of the formula $$(C_6H_5)_3Sn \cdot S_x \cdot Sn(C_6H_5)_3$$

where $x=1$ to 4, is used as the active ingredient.

Particularly good results have been obtained with the compound in which $x=1$, the bis(triphenyl tin) sulphide; the bis(triphenyl tin) disulphide also gave very good results.

The absence and the slight degree of phytotoxicity were found during investigations in which for comparison triphenyl tin acetate and a bis(trialkyl tin) sulphide, the bis(tributyl tin) sulphide have also been tested.

In this investigation, leaves of young plants of dwarf French bean, chickweed, potato, beet and cucumber were sprayed with certain amounts of suspensions of the substance to be investigated, which contained 0.1, 0.3, 1 and 3% by weight of that substance, respectively. 10 days after spraying, the resulting leaf burning was determined. The results, which are listed in Table I, were marked as follows:

— =no burning, 1=0 to 0.1 part, 2=0.1 to 0.3 part, 3=0.3 to 0.6 part, 4=0.6 to 0.9 part, 5=0.9 to 1 part burned and 6=completely burned.

Table I

| | Conc., percent | Dwarf French bean | Chickweed | Potato | Beet | Cucumber |
|---|---|---|---|---|---|---|
| Bis(triphenyl tin) sulphide. | 0.1 | — | — | — | — | — |
| | 0.3 | — | — | — | — | 1 |
| | 1 | — | — | — | — | 2 |
| | 3 | — | — | — | — | 3 |
| Bis(triphenyl tin) disulphide. | 0.1 | — | — | — | — | 2 |
| | 0.3 | — | — | — | — | 2 |
| | 1 | — | — | — | — | 3 |
| | 3 | — | — | — | — | 3 |
| Bis(tributyl tin) sulphide. | 0.1 | 4 | 1 | 2 | 3 | 6 |
| | 0.3 | 5 | 1 | 3 | 4 | 6 |
| | 1 | 6 | 3 | 4 | 6 | 6 |
| | 3 | 6 | 4 | 6 | 6 | 6 |
| Triphenyl tin acetate. | 0.1 | — | 1 | — | — | 3 |
| | 0.3 | 2 | 1 | — | — | 3 |
| | 1 | 3 | 2 | 1 | — | 4 |
| | 3 | 5 | 2 | 2 | 1 | 6 |

The conversion of the bis(triphenyl tin) sulphides to compositions for combating moulds on living plants, such as dusts, wettable powders, liquid concentrates and seed disinfectants, may be effected in the manners known for such compositions.

Such compositions are, for example:

(1) Dusts containing from 0.2 to 10% by weight and, for example, 0.5% by weight of active ingredient in a mixture of kieselguhr and dolomite;

(2) Wettable powders containing from 15 to 60% by weight and, for example, 20% by weight of active ingredient and in addition wetting agent, such as fatty alcohol sulphates or alkylaryl sulphonates, and dispersing agents and an inert carrier, for example kaolin, chalk or pipeclay, which may be conditioned with colloidal silicic acid;

(3) Liquid concentrates containing from 5 to 30% by weight and, for example, 15% by weight of active ingredient, from 1 to 10% of non-ionogenic emulsifying agent or a mixture thereof with an anion-active emulsifying agent, the remainder being solvents (substantially ketones, such as cyclohexanone);

(4) Seed disinfectants containing from 0.5 to 10% by weight and, for example 5% by weight of active ingredient in combination with, for example, kaolin, with the addition of a small amount of an adhesive.

It has been found that a composition having optimum fungitoxic activity is obtained if a suspension thereof in water, for example a suspension of 1% by weight, has a pH value between 6 and 7.

Bis(triphenyl tin) sulphide is a known substance. It has been stated that this compound might be formed from two molecules of triphenyl tin mercaptan by splitting off hydrogen sulphide.

It has now been found that the bis(triphenyl tin) sulphide may be produced by the reaction of a compound of the formula $(C_6H_5)_3Sn.X$, where X is an inorganic or organic acid radical, with a metal sulphide, in particular a sodium or potassium sulphide or an alkaline earth sulphide, and ammonium sulphide.

Bis(triphenyl tin) disulphide and bis(triphenyl tin) polysulphides are new substances. These compounds may be produced by reacting a compound of the formula $(C_6H_5)_3Sn.X$, where X is an inorganic or organic acid radical, with an alkali or alkaline earth disulphide or polysulphide or with ammonium disulphide or polysulphide. Suitable triphenyl tin compounds $(C_6H_5)_3Sn.X$ are especially triphenyl tin chloride and acetate. Suitable di- and polysulphides are especially sodium, potassium and ammonium disulphides and polysulphides.

What is claimed is:

1. Compounds of the formula $$(C_6H_5)_3Sn \cdot S_x \cdot Sn(C_6H_5)_3$$

where $x$ is an integer of 2 to 4.

2. A composition for combating fungi on living plants comprising a fungicidally effective amount of a triphenyl tin compound of the formula:

$$(C_6H_5)_3Sn \cdot S_x \cdot Sn(C_6H_5)_3$$

wherein $x$ is an integer of 2–4 and an inert carrier therefor.

3. The composition of claim 2 wherein a 1% by weight suspension in water of said composition has a pH value of between 6 and 7.

4. The composition of claim 2 wherein the tin compound is bis(triphenyl tin) disulfide.

5. The method of combating fungi on living plants comprising treating said plants with a fungicidally effective amount of a triphenyl tin compound of the formula:

$$(C_6H_5)_3Sn \cdot S_x \cdot Sn(C_6H_5)_3$$

wherein $x$ is an integer of 1–4.

References Cited in the file of this patent
UNITED STATES PATENTS 2,770,611    Nitzsche et al. _____ Nov. 13, 1956
2,832,753    Weinberg _____ Apr. 29, 1958

OTHER REFERENCES

Chem. Abs., volume 53, 1959, page 21757(d).